United States Patent [19]

Miyazaki et al.

[11] Patent Number: 5,594,090
[45] Date of Patent: Jan. 14, 1997

[54] ALKYLENE SULFIDE GROUP-CONTAINING PREPOLYMER, POLYMERIZABLE COMPOSITION AND OPTICAL MATERIAL

[75] Inventors: Tsuyoshi Miyazaki, Tsukuba; Hiromitsu Nakajima, Mitsukaido; Shuji Ichikawa, Tsukuba; Yasumi Koinuma, Tsukuba; Kazuo Matsuyama, Tsukuba; Koji Kamenosono, Tsukuba; Yoshihiro Minoshima, Tsukuba, all of Japan

[73] Assignee: NOF Corporation, Tokyo, Japan

[21] Appl. No.: 416,341

[22] Filed: Apr. 4, 1995

[30] Foreign Application Priority Data

Apr. 6, 1994 [JP] Japan .................................. 6-068758
Apr. 7, 1994 [JP] Japan .................................. 6-069540
Aug. 5, 1994 [JP] Japan .................................. 6-184392

[51] Int. Cl.$^6$ .................................................. C08G 12/20
[52] U.S. Cl. .......................... 528/265; 528/373; 528/374; 528/376; 568/77
[58] Field of Search .......................... 528/265, 373, 528/374, 376; 568/77

[56] References Cited

U.S. PATENT DOCUMENTS 5,288,844  2/1994  Sakagami ............................... 528/376

FOREIGN PATENT DOCUMENTS 4-045115  2/1992  Japan .................................. 526/286

*Primary Examiner*—Mark D. Sweet
*Attorney, Agent, or Firm*—Darby & Darby

[57] ABSTRACT

A first prepolymer contains a structural unit represented by the formula

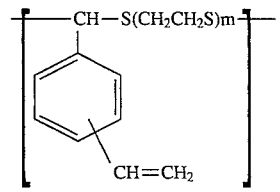

where m denotes a positive number of from 2 to 20 with a polymerization degree of 2 to 1000. A second prepolymer contains a structural unit represented by the formula

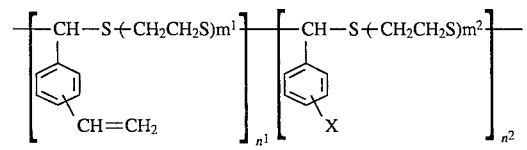

where X denotes a hydrogen atom or a halogen atom, $m^1$ and $m^2$ denote positive numbers of from 2 to 20 and $n^1+n^2$ denote positive numbers of from 2 to 1000, with $n^1$ and $n^2$ being not equal to 0, the prepolymer having a polymerization degree of 2 to 1000. An optical material with a high refractive index is obtained by polymerizing and curing a polymerizable composition containing the first or second prepolymer.

6 Claims, No Drawings

ALKYLENE SULFIDE GROUP-CONTAINING PREPOLYMER, POLYMERIZABLE COMPOSITION AND OPTICAL MATERIAL

BACKGROUND OF THE INVENTION

This invention relates to a novel prepolymer and a method for preparation thereof and, more particularly, to a novel prepolymer and a method for preparation thereof, which prepolymer has a styryl group rich in polymerizability and addition reactivity in its side chain and an alkylene sulfide group in its main chain superior in optical properties, such as refractive index and color aberration, mechanical and thermal properties, such as resistance against warping, shock-proofness or thermal stability and chemical stability such as weatherability or resistance against solvents and which may be utilized for a high molecular material such as optical resins, e.g. plastic lenses or anti-refraction coating, coating resins or ornamental resins or high molecular material modifiers. The present invention also relates to a polymerizable composition utilizable as a polymerization component such as an optical resin, a coating resin or an ornamental resin and an optical material utilizable as plastic lenses for eye-glasses or business machines.

As prepolymers having double bonds, there have hitherto been known unsaturated polyesters, which are condensates of maleic anhydride, phthalic acid and ethylene glycol, oil-modified alkyd resins, which are condensates of phthalic acid, glycerin and oleic acid, or oligoester acrylates, which are condensates of polyethylene glycol and acrylic acid. The resins produced by cross-linking these prepolymers are known to be superior in mechanical properties and resistance against solvents by the three-dimensional structure of the resins, while being free from generation of by-products during curing and being curable with a minor quantity of catalysts.

There is proposed in Japanese Laid-open Patent Application No. 2-160762 dimercaptodiphenyl sulfide dimethacrylate, while there is disclosed in Japanese Laid-open Patent Application No. 2-29401 a sulfur-containing polymerizable monomer, such as 2-(vinyl benzyl sulfide) benzothiazole. However, a prepolymer having an alkylene sulfide group in its main chain and a reactive styryl group in its side chain has not been known to data.

Recently, synthetic resin materials excellent in lightness in weight, moldability, shock-proofness and dyeability, are being used as plastic lens materials to take the place of inorganic glass. These synthetic resin materials may be enumerated by, for example, polymethyl methacrylate, polydiethylene glycol bisallyl carbonate, polystyrene and polycarbonate. Polymethyl methacrylate and polydiethylene glycol bisallyl carbonate, however, are as low as about 1.49 in refractive index, although they are superior in lightness in weight and shock-proofness, such that, if these resin materials are employed for lenses, it becomes necessary to increase the lens thickness as compared to that of a lens of inorganic glass, and hence these resin materials are not suited for use for high multiplication or lightweight lenses. On the other hand, while polystyrene and polycarbonate are as high as 1.58 to 1.59 in refractive index, they are thermoplastic resins and hence are susceptible to optical distortion due to double refraction in the course of injection molding, while being inferior in resistance against solvents or scratch-proofness.

Recently, a variety of proposals have been made for obviating these drawbacks. For example, there is disclosed in Japanese Laid-open Patent Application No. 53-7787 a copolymer of diethylene glycol biscarbonate and diallyl isophthalate, while there are disclosed in Japanese Laid-open Patent Application Nos. 59-81318 and 59-191708 a copolymer of diallyl phthalate and an unsaturated fatty acid alcohol—benzoic acid ester and a copolymer of a di(meth)acrylate having bisphenol A, diallyl isophthalate and diethylene glycol bisallyl carbonate, respectively. While these copolymers have the refractive index on the order of 1.52 to 1.55, these copolymers are defective in that unreacted allyl monomers tend to be left.

On the other hand, there are disclosed in Japanese Laid-open Patent Application Nos. 57-28115 and 60-55007 a copolymer of styrene vinyl monomer and heavy metal salts of unsaturated carboxylic acid and a copolymer of halogen-substituted diallyl phthalate and halogen-substituted allyl benzoate, respectively. While these copolymers are as high as about 1.58 to 1.60 in refractive index, these copolymers are defective in that the specific gravity of the copolymers is high since the allyl monomer having a halogen-substituted aromatic ring or metal salts is employed, and hence the resulting lens cannot be reduced in weight.

In addition, there are proposed in Japanese Laid-open Patent Application Nos. 2-160762 and 2-29401 dimercapto diphenyl sulfido dimethacrylate and 2-(vinyl benzyl sulfide) benzothiazole, respectively as mentioned above. Although these polymers are as high as about 1.60 to 1.70 in refractive index, these polymers exhibit color aberration and are inferior in dimensional stability, while the polymerization reaction thereof is difficult to control. In addition, these polymers are high in specific gravity and inferior in weatherability.

SUMMARY OF THE INVENTION

It is an object of the present invention to provide a novel prepolymer which has a recurrent unit of alkylene sulfide in its main chain and a styryl group in its side chain and which may be employed as a starting material for an optical material, a coating resin or an ornamental resin exhibiting high refractive index and light transmittance, and a method for preparation thereof.

It is another object of the present invention to provide a polymerizable composition which is superior in weatherability, resistance against solvents and dimensional stability, light in specific gravity and high in refractive index and optical transparency, and which may be utilized as a starting material for an optical material, a coating resin or an ornamental resin.

It is a further object of the present invention to provide an optical material which is superior in weatherability, resistance against solvents and in dimensional stability, light in specific gravity and high in refractive index and optical transparency.

The above and other objects of the present invention will become apparent from the following description.

In one aspect, the present invention provides a prepolymer including a structural unit represented by the formula

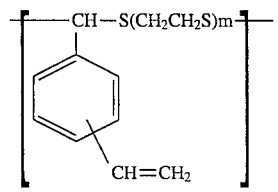

where m denotes a positive number of from 2 to 20 with a polymerization degree of 2 to 1000.

In another aspect, the present invention provides a method for preparing a prepolymer including a structural unit represented by the formula

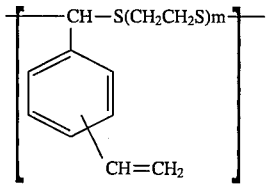

where m denotes a positive number of from 2 to 20 with a polymerization degree of 2 to 1000, comprising reacting vinyl benzaldehyde with an alkylene sulfide group-containing compound represented by the formula

$HS(CH_2CH_2S)_mH$ wherein m denotes a positive number of from 2 to 20, in the presence of an acid catalyst.

In still another aspect, the present invention provides a polymerizable composition containing a prepolymer including a structural unit represented by the formula

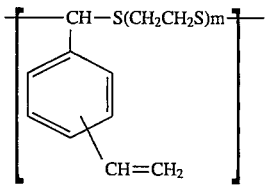

where m denotes a positive number of from 2 to 20 with a polymerization degree of 2 to 1000.

In still another aspect, the present invention provides an optical material with a refractive index of not less than 1.55 obtained by polymerizing and curing the above-mentioned polymerizable composition.

In still another aspect, the present invention provides a prepolymer containing a structural unit represented by the formula

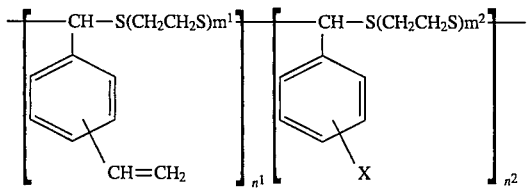

where X denotes a hydrogen atom or a halogen atom, $m^1$ and $m^2$ denote positive numbers of from 2 to 20 and $n^1+n^2$ denote positive numbers of from 2 to 1000 with $n^1$ and $n^2$ being not equal to 0, with the prepolymer having a polymerization degree of 2 to 1000.

In yet another aspect of the present invention, the present invention provides a method for preparing a prepolymer containing a structural unit represented by the formula

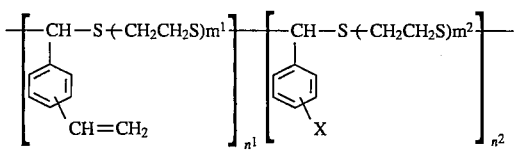

where X denotes a hydrogen atom or a halogen atom, $m^1$ and $m^2$ denote positive numbers of from 2 to 20 and $n^1+n^2$ denote positive numbers of from 2 to 1000 with $n^1$ and $n^2$ being not equal to 0, with the prepolymer having a polymerization degree of 2 to 1000, comprising reacting, in the presence of an acid catalyst, vinyl benzaldehyde, a benzaldehyde compound represented by the formula

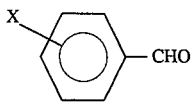

where X denotes a hydrogen atom or a halogen atom, and an alkylene sulfide group-containing compound represented by the formula

$HS—(CH_2CH_2S)_mH$ where m denotes a positive number of from 2 to 20.

In still another aspect, the present invention provides a polymerizable composition containing a prepolymer including a structural unit represented by the formula

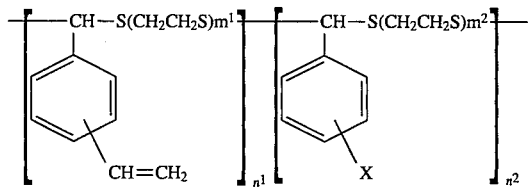

where X denotes a hydrogen atom or a halogen atom, $m^1$ and $m^2$ denote positive numbers of from 2 to 20 and $n^1+n^2$ denote positive numbers of from 2 to 1000 with $n^1$ and $n^2$ being not equal to 0, with the prepolymer having a polymerization degree of 2 to 1000.

In still another aspect, the present invention provides an optical material with a refractive index of not less than 1.52 obtained by polymerizing and curing the above-mentioned polymerizable composition.

PREFERRED EMBODIMENTS OF THE INVENTION

The present invention will be explained in detail hereinbelow.

The first prepolymer of the present invention includes a structural unit represented by the formula

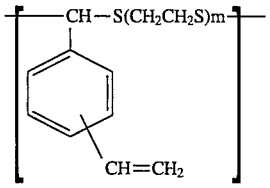

where m denotes a positive number of from 2 to 20, and has a polymerization degree of 2 to 1000. The polymerizable composition of the present invention includes the above-identified first prepolymer.

If m in the first prepolymer is 21 or more, manufacture becomes difficult. The lower limit of the polymerization degree of the prepolymer is equal to 2 and preferably equal to 5 for manifesting sufficient desirable characteristics. The upper limit of the polymerization degree of the prepolymer is equal to 1000 and preferably equal to 500 for preventing ease in handling from being lowered due to high viscosity. The lower limit of the molecular weight of the prepolymer is preferably 500 for manifesting prepolymer characteristics and more preferably 1000 for sufficiently manifesting the prepolymer characteristics. The upper limit of the molecular weight is preferably 500000 for preventing ease in handling from being lowered due to high viscosity and more preferably 10000 for further improving ease in handling.

The aforementioned first prepolymer may be enumerated by compounds represented by the following formulas:

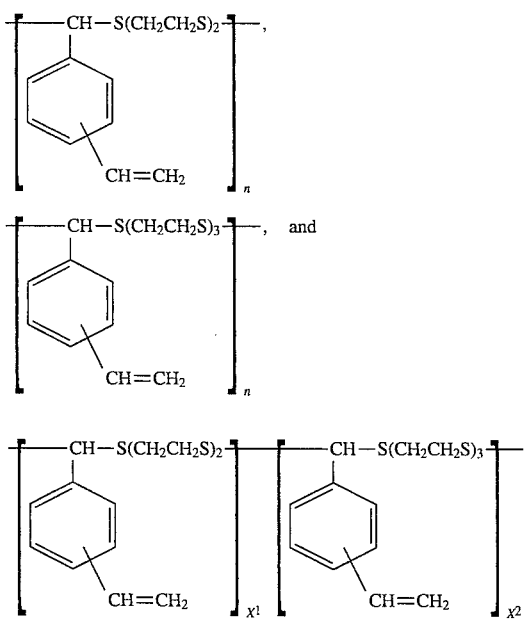

wherein n denotes the above polymerization degree and $X^1+X^2=n$.

On the other hand, the second prepolymer of the present invention contains a structural unit represented by the formula

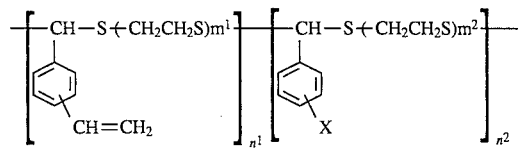

where X denotes a hydrogen atom or a halogen atom, $m^1$, and $m^2$ denote positive numbers of from 2 to 20 and $n^1+n^2$ denote positive numbers of from 2 to 1000 with $n^1$ and $n^2$ being not equal to 0. If, with the second prepolymer, $m^1$ or $m^2$ are 21 or more, manufacture becomes difficult. The lower limit of the polymerization degree of the second prepolymer is 2 and preferably 5 for sufficiently manifesting prepolymer characteristics, while the upper limit of the polymerization degree is 1000 and preferably 500 for preventing ease in handling from being lowered due to high viscosity. The lower limit of the molecular weight of the second prepolymer is preferably 500 for manifesting prepolymer characteristics and more preferably 1000 for sufficiently manifesting the prepolymer characteristics. The upper limit of the molecular weight is preferably 500000 for preventing ease in handling from being lowered due to high viscosity and more preferably 10000 for further improving ease in handling.

The aforementioned second prepolymer may be enumerated by compounds represented by the following formulas:

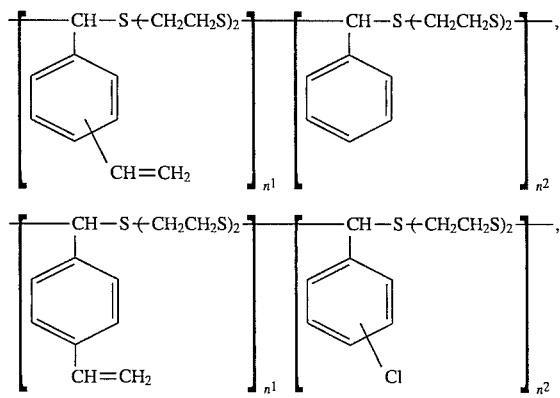

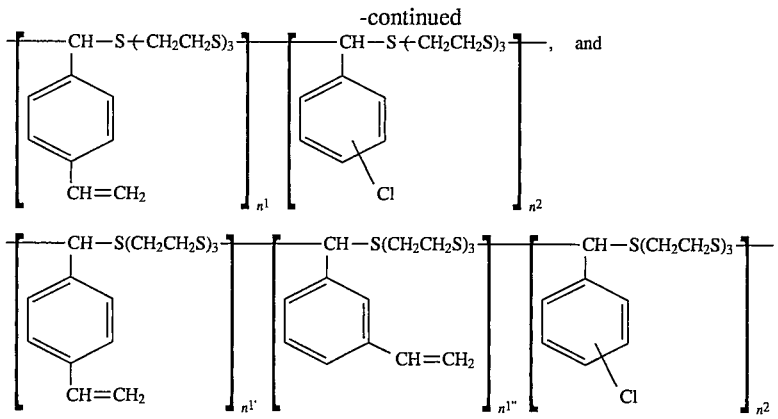

wherein $n^1$ and $n^2$ are the same as $n^1$ and $n^2$ of the aforementioned formula and $n^{1'}+n^{1''}=n^1$.

For preparing the first prepolymer, benzaldehyde is reacted with an alkylene sulfide group-containing compound represented by the following formula

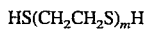

where m denotes a positive number of from 2 to 20, in the presence of an acid catalyst.

For preparing the second prepolymer, vinyl benzaldehyde is reacted with a benzaldehyde compound represented by the formula

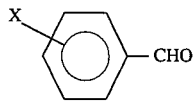

where X denotes a hydrogen atom or a halogen atom, and with an alkylene sulfide group-containing compound represented by the following formula

where m denotes a positive number of from 2 to 20, in the presence of an acid catalyst, Examples of vinyl benzaldehyde include p-vinyl benzaldehyde, m-vinyl benzaldehyde, o-vinyl benzaldehyde and mixtures thereof.

Examples of the benzaldehyde compounds include o-benzaldehyde, p-benzaldehyde, m-benzaldehyde, p-chlorobenzaldehyde, m-chlorobenzaldehyde, o-chlorobenzaldehyde p-bromobenzaldehyde, m-bromobenzaldehyde and o-bromobenzaldehyde, These may be employed singly or as a mixture.

In the above alkylene sulfide group-containing compounds, m denotes a positive number of from 2 to 20 and preferably 2 or 3.

Examples of the alkylene sulfide group-containing compounds include $HS(CH_2CH_2S)_2H$, $HS(CH_2CH_2S)_3H$, $HS(CH_2CH_2S)_4H$, $HS(CH_2CH_2S)_5H$, $HS(CH_2CH_2S)_6H$, $HS(CH_2CH_2S)_7H$, $HS(CH_2CH_2S)_8H$, $HS(CH_2CH_2S)_9H$, $HS(CH_2CH_2S)_{10}H$, $HS(CH_2CH_2S)_{11}H$, $HS(CH_2CH_2S)_{12}H$, $HS(CH_2CH_2S)_{13}H$, $HS(CH_2CH_2S)_{14}H$, $HS(CH_2CH_2S)_{15}H$, $HS(CH_2CH_2S)_{16}H$, $HS(CH_2CH_2S)_{17}H$, $HS(CH_2CH_2S)_{18}H$, $HS(CH_2CH_2S)_{19}H$ and $HS(CH_2CH_2S)_{20}H$. These may be used alone or in combination.

Examples of the acid catalysts include Lewis acids, such as $TiCl_4$, $AlCl_3$, $FeCl_3$, $ZnCl_2$, or $BF_3$; mineral acids, such as hydrochloric acid or sulfuric acid; organic acids, such as p-toluene sulfonic acid, benzene sulfonic acid or trifluoroacetic acid; and cationic exchange resins. $TiCl_4$ and hydrochloric acid are preferred because of ease in handling and high activity.

The first or second prepolymer may be produced in the absence of solvents or in the presence of organic solvents such as chloroform, methylene chloride, acetonitrile, benzene or toluene. Specifically, the first or second prepolymer may be produced by reacting the reactants under agitation after addition preferably of 0.001 to 30 wt % and more preferably of 0.1 to 10 wt % of the above catalyst. For preparing the first prepolymer, the charging molar ratio of vinyl benzaldehyde to the alkylene sulfide group-containing compound is preferably 1:0.5 to 1:2 mol and preferably 1:0.8 to 1:1.2 mol. The reaction temperature is preferably −100° to 120° C. and more preferably 0° to 60° C. The reaction time is preferably 1 minute to 48 hours and more preferably 30 minutes to 24 hours. For preparing the second prepolymer, the charging molar ratio of the sum of vinylbenzaldehyde and the benzaldehyde compound to the alkylene sulfide group-containing compound is preferably 1:0.5 to 1:2 mol and more preferably 1:0.8 to 1:1.2 mol. The charging molar ratio of vinyl benzaldehyde to the benzaldehyde compound is preferably 1:0.05 to 1:100 mol and more preferably 1:0.1 to 1:10 mol. The reaction temperature is preferably −100° to 120° C. and more preferably 0° to 60° C. The reaction time is preferably 1 minute to 200 hours and more preferably 30 minutes to 48 hours.

The first and second prepolymers produced may be easily isolated and purified by methods known in the art, such as washing and extraction, reprecipitation, column separation, treatment with an adsorbent or treatment with ion exchange resins.

Since the first and second prepolymers exhibit superior addition reactivity in the styryl groups of the side chains thereof, mercapto-containing compounds, such as mercapto ethanol or thiophenol or amino group-containing compounds, such as dimethylamine or diethylamine, may be easily added thereto by the addition reaction.

Such addition reaction can be effected by reacting the reactants under agitation at a reaction temperature of preferably −100° to 150° C. and more preferably 0° to 100° C. for a reaction time especially of 10 minutes to 100 hours, preferably 10 minutes to 12 hours in the presence of an oxidizing agent, such as oxygen, air or peroxides or a basic catalyst such as amine or alkoxide in the absence of a solvent or in the presence of an organic solvent, such as acetonitrile, methanol, ethanol, N,N-dimethyl formamide, dimethyl sulfoxide, tetrahydrofuran or chloroform.

The first and second prepolymers exhibit superior polymerizability and can be polymerized alone or with other polymerizable monomers copolymerizable with the prepolymers to produce resins superior in optical properties, mechanical properties, thermal properties, chemical stability or weatherability.

Examples of the aforementioned other polymerizable monomers preferably include monofunctional monomers, such as styrene, p-methylstyrene, p-chlorostyrene, o-chlorostyrene, p-bromostyrene, o-bromostyrene, a-methylstyrene, vinyl acetate, vinyl propionate, methyl (meth)acrylate, butyl (meth)acrylate, ethyl (meth)acrylate, phenyl (meth)acrylate, benzyl (meth)acrylate, bromophenyl (meth)acrylate, (meth)acrylonitrile, (meth)acrylic acid or 2-hydroxyethyl (meth)acrylate, and polyfunctional monomers, such as 2,2-bis(4-(meth)acryloyloxy ethoxy phenyl) propane, 2,2-bis(4-(meth)acryloylpoly (n=2 to 20) ethoxy phenyl) propane, 2,2-bis(4-2'-hydroxy-3'-(meth)acryloyloxy propoxy phenyl) propane, diethylene glycol bisallyl carbonate, diallyl tetrachlorophthalate, diallyl phthalate, p-divinyl benzene, m-divinyl benzene, divinyl biphenyl, ethylene glycol bis(meth)acrylate, diethylene glycol bis(meth)acrylate, triethylene glycol bis(meth)acrylate, tetraethylene glycol bis(meth)acrylate, polyethylene glycol bis(meth)acrylate, dipropylene glycol bis(meth)acrylate, propylene glycol bis(meth)acrylate, bisphenol A bis(meth)acrylate, diallyl tetrachlorophthalate, diallyl isophthalate, allyl (meth)acrylate, trimethylol propane tri(meth)acrylate, tetramethylol methane tri(meth)acrylate, or tetramethylol methane tetra(meth)acrylate.

Copolymerization of the first or second prepolymer with the aforementioned other polymerizable monomer may be effected for example in the presence of a radical polymerization initiator through photopolymerization or polymerization by heating.

The radical polymerization initiators include organic peroxides and/or azo compounds having temperature of the selected 10-hour half life period of not higher than 160° C. Examples of the radical polymerization initiators include benzoyl peroxide, diisopropyloxy dicarbonate, tertiary butyl peroxy-2-ethyl hexanoate, tertiary butyl peroxy pivalate, tertiary butyl peroxy diisobutylate, lauroyl peroxide, tertiary butyl peroxy acetate, tertiary butyl peroxy 2-ethyl hexanoate, tertiary butyl peroxy benzoate, azo bisisobutyronitrile, and mixtures thereof. The radical polymerization initiators are employed preferably in an amount of 10 parts by weight or less and more preferably in an amount of 5 parts by weight or less to 100 parts by weight of the monomer composition.

The essential components in the polymerizable composition according to the present invention may be any of the above-mentioned first or second prepolymer by itself, the combination of the first or second prepolymer and the monofunctional monomer, the combination of the first or second prepolymer and the polyfunctional monomer and the combination of the monofunctional monomer and the polyfunctional monomer. For preparing a cured product having superior mechanical strength, it is desirable that the above-mentioned monofunctional monomer be contained in the polymerizable composition.

In the polymerizable composition, the proportion of the first or second prepolymer is such that, based on the total quantity of the composition, the lower limit of the first or second prepolymer is 1 wt % for displaying optical properties of the first or second prepolymer and is 20 wt % for sufficiently displaying the optical properties of the first or second prepolymer, while the upper limit of the first or second prepolymer is preferably 100 wt % and more preferably 80 wt % for improving the mechanical strength. On the other hand, the proportion of the other copolymerizable monomer is 99 wt % or less and preferably 20 to 80 wt % based on the total weight of the composition.

For polymerizing and curing the polymerizable composition of the present invention, conditions that are suited to the material desired to be cured are selected and polymerization may be carried out in accordance with the method for preparing the optical material as later explained.

The optical material of the present invention, in which the above-mentioned polymerizable composition containing the first prepolymer is cured by polymerization, has a refractive index of not lower than 1.55 and preferably in a range of 1.56 to 1.68. That is, the optical material of the present invention is a polymer of the first prepolymer by itself or a copolymer of the above-mentioned first prepolymer and the other copolymerizable monomer and has the aforementioned specific refractive index.

The optical material of the present invention, in which the above-mentioned polymerizable composition containing the second prepolymer is cured by polymerization, has a refractive index of not lower than 1.52 and preferably in a range of 1.53 to 1.70. That is, the optical material of the present invention is a polymer of the second prepolymer by itself or a copolymer of the above-mentioned second prepolymer and the other copolymerizable monomer and has the aforementioned specific refractive index.

The optical material of the present invention may be produced by photopolymerization or polymerization under heating of the polymerizable composition in the presence of the radical polymerization initiator as previously explained.

The polymerization conditions may be suitably selected depending on the targeted optical materials. In the preparation of a plastic lens for eye glasses, for example, the polymerizable composition and the radical polymerization initiator may be directly charged into a desired mold and polymerized under heating at a temperature preferably of 0° to 200° C. for one to 200 hours. Preferably, the polymerization system is placed under an atmosphere of inert gases, such as nitrogen, carbon dioxide or helium, or under an atmosphere replaced by these inert gases. The optical material may also be produced by a method consisting in prepolymerizing the polymerizable composition at a temperature preferably 0° to 200° C. for 0.5 to 48 hours and subsequently charging the pre-polymerized mass in a suitable mold for post-polymerization. Upon curing by polymerization, it is possible to add suitable additives, such as UV ray absorber or a coloration inhibiting agents, while it is possible to effect various surface treatment operations for the cured surface for improving surface properties of the resulting cured product.

The first and second prepolymers of the present invention are novel prepolymers each having an alkylene sulfide group and a styryl group in the main and side chains thereof, respectively, and may be advantageously used for optical materials, coating resins or ornamental resins exhibiting superior optical, mechanical and thermal properties, stable chemical properties and weatherability. With the method of the present invention, such prepolymer may be produced easily and with a high yield. In addition, since the optical material of the present invention is a cured product of the polymerizable composition, it has excellent optical properties, such as refractive index, transparency and resistance against solvents, and may be advantageously employed as a plastic lens for eye glasses or business machines.

EXAMPLES OF THE INVENTION

While the present invention is explained in detail with reference to the examples, the present invention is not limited thereto.

Example I-1

1.0 g (7.6 mmol) of p-vinylbenzaldehyde and 1.4 g (9.0 mmol) of bis-(2-mercaptoethyl) sulfide were charged in 5 ml of chloroform and cooled to −10° C. followed by adding 0.19 g (1 mmol) of $TiCl_4$ to be subjected to reaction under agitation at 30° C. for 4 hours. The progress of the reaction was confirmed by the disappearance of absorption of IR spectrum at 1700 $cm^{-1}$ due to aldehyde. After the reaction, the resulting mass was washed with a 5 wt % aqueous sodium hydroxide solution and distilled water and the organic phase was concentrated under reduced pressure. After subjecting to further pressure reduction by a vacuum pump, the solvent was distilled off at 40° C. for 2 hours to obtain a colorless transparent viscous liquid, which was an objective prepolymer (Hereinafter referred to as "Prepolymer (I)"). The yield was 92%. The molecular weight of the compound obtained was measured by gel permeation chromatography (GPC) (column; developer, tetrahydrofuran; standard sample, polystyrene) to find about 9000.

The results of measurement by $^1$H-NMR, $^{13}$C-NMR, IR, and elementary analysis of the compound obtained are shown below, $^1$H—NMR(270 MHz, $CDCl_3$, TMS, δ(ppm), J(Hz))

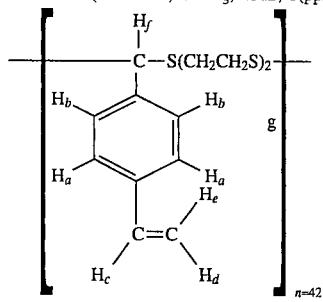

7.36(a, b; m, 4H)
6.68(c; dd, 1H, Jd=11.1, Je=17.3)
5.74(e; d, 1H, Jc=17.5)
5.26(d; d, 1H, Jc=10.6)
5.00(f; s, 1H)
2.63(g; m, 8H)

$^{13}$C—NMR(270 MHz, $CDCl_3$, TMS, δ(ppm))

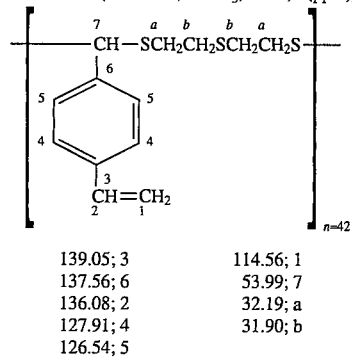

| | |
|---|---|
| 139.05; 3 | 114.56; 1 |
| 137.56; 6 | 53.99; 7 |
| 136.08; 2 | 32.19; a |
| 127.91; 4 | 31.90; b |
| 126.54; 5 | |

IR (KBr; $cm^{-1}$)

1510, 860 (para- or di-substituted benzene)

2990, 1408, 990 (vinyl)

Elementary analysis ($C_{13}H_{16}S_3$)

Calculated; H:6.02, C:58.20, S:35.78

Found; H:6.00, C:58.28, S:35.72

Example I-2

The same procedure as in Example I-1 was repeated except that a mixture of p-vinylbenzaldehyde and m-vinylbenzaldehyde of 3:7 (by weight ratio) was employed in stead of p-vinylbenzaldehyde, to give an objective prepolymer in the form of a colorless transparent liquid. The yield was 35%. The molecular weight was about 9500.

The results of measurement by $^{13}$C-NMR, IR, and elementary analysis of the compound obtained are shown below.

$^{13}$C—NMR(270 MHz, $CDCl_3$, TMS, δ(ppm))

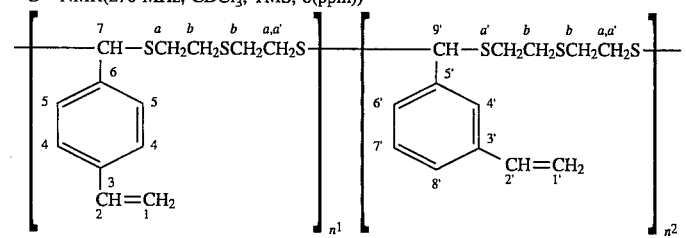

| | | |
|---|---|---|
| 139.93; 3 | 125.54; 7 | $(n^1 + n^2) = 44$ |
| 138.02; 5 | 114.70; 1 | |
| 136.24; 2 | 53.57; 9 | |
| 128.88; 4 | 32.19; a,a' | |
| 127.08; 8 | 31.90; b | |
| 126.00; 6 | | |

IR(KBr; cm$^{-1}$)
  1510, 860 (para- or di-substituted benzene)
  790, 695 (meta- or di-substituted benzene)
  2990, 1408, 990 (vinyl)
Elementary analysis
  Calculated; H:6.02, C:58.20, S:35.78
  Found; H:6.06, C:58.30, S:35.64

Example I-3

The same procedure as in Example I-1 was repeated except that bis(2-mercaptoethyl)-1,2-dithioethane(HS(CH$_2$CH$_2$S)$_3$H) was employed in stead of bis(2-mercaptoethyl)sulfide, to obtain an objective prepolymer (Hereinafter referred to as "Prepolymer II") in the form of a colorless transparent viscous liquid. The yield was 91%. The molecular weight was 11500.

The results of measurement by $^1$H-NMR, $^{13}$C-NMR, IR, and elementary analysis of the compound obtained are shown below, $^1$H—NMR(270 MHz, CDCl$_3$, TMS, δ(ppm), J(Hz))

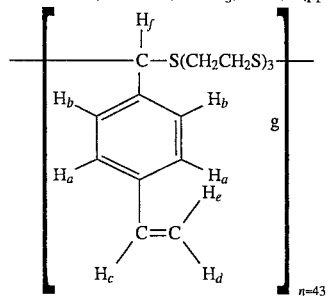

7.38(a, b; s, 4H)
6.69(c; dd, 1H, Jd=10.9, Je=25.3)
5.75(e; d, 1H, Jc=17.5)
5.26(d; d, 1H, Jc=10.9)
5.00(f; s, 1H)
2.68(g; m, 12H)

$^{13}$C—NMR(270 MHz, CDCl$_3$, TMS, δ(ppm))

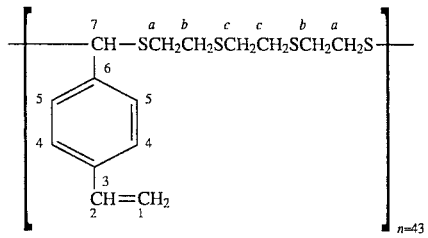

| | |
|---|---|
| 138.98; 3 | 114.54; 1 |
| 137.56; 6 | 53.40; 7 |
| 136.05; 2 | 32.26; a |
| 127.87; 4 | 32.15, 32.08; b, c |
| 126.52; 5 | |

IR (KBr; cm$^{-1}$)
  1510, 860 (para- or di-substituted benzene)
  790, 695 (meta- or di-substituted benzene)
  2990, 1409, 990 (vinyl)
Elementary analysis (C$_{15}$H$_{20}$S$_4$)
  Calculated; H:6.14, C:54.87, S:38.99
  Found; H:6.16, C:54.92, S:38.92

Example-I-4

The same procedure as in Example I-3 was repeated except that a mixture of p-vinylbenzaldehyde and m-vinylbenzaldehyde of 3:7 (by weight ratio) was employed in stead of p-vinylbenzaldehyde, to give an objective repolymer in the form of a colorless transparent liquid. The yield was 93%. The molecular weight was 12000.

The results of measurement by $^{13}$C-NMR, IR, and elementary analysis of the compound obtained are shown below, $^{13}$C—NMR(270 MHz, CDCl$_3$, TMS, δ(ppm))

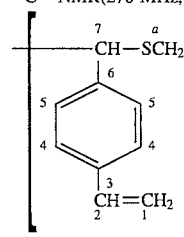 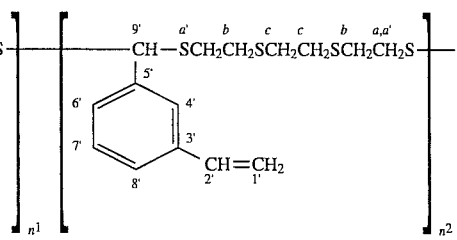

| | | |
|---|---|---|
| 139.89; 3' | 126.06; 6' | |
| 138.99; 3 | 125.55; 7' | |
| 138.06; 5' | 114.72; 2' | |
| 137.57; 5 | 114.57; 2 | n$^1$:n$^2$ = 3:7 |
| 136.24; 2' | 53.62; 9' | (n$^1$ + n$^2$) – 44 |
| 136.05; 2 | 53.41; 7 | |
| 128.90; 4' | 32.31; a' | |
| 127.89; 4 | 32.26; a | |
| 127.10; 8' | 32.15, 32.10; b, c | |
| 126.52; 5 | | |

IR(KBr; cm$^{-1}$)
  1510, 860 (para- or di-substituted benzene)
  790, 695 (meta- or di-substituted benzene)
  2990, 1409, 990 (vinyl)
Elementary analysis (C$_{15}$H$_{20}$S$_4$)

Calculated; H:6.14, C:54.87, S:38.99
Found; H:6.18, C:54.94, S:38.88

Examples II-1 to II-10

Polymerizable compositions shown in Table 1 were prepared using the Prepolymer (I) synthesized in Example I-1 (Examples II-1 to II-5) and the Prepolymer (II) synthesized in Example I-3 (Examples II-6 to II-10). 0.01 g of t-butyl peroxy 2-ethyl hexanoate (a polymerization initiator available under the tradename "PERBUTYL O" from NOF CORPORATION) was added to each of the polymerizable compositions thus prepared (total amount 1 g). After the inside of test tubes was replaced by nitrogen, each of the compositions was heated and cured at 70° C. for 12 hours. The refractive index and the Abbe's number of resins thus obtained were measured by an Abbe's refractometer (Tradename "2T" manufactured ATAGO KK). The external appearance and the deformation in appearance after immersion in boiling water for 10 minutes were evaluated by naked eyes. The results are shown in Table 1.

Comparative Examples 1 to 3

Each of the polymerizable compositions prepared in mixing ratios shown in Table 1 was polymerized and cured similarly to Example II-1. The refractive index, Abbe's number, external appearance, and deformation in appearance were measured. The results are shown in Table 1.

Examples III-1

500 mg (4.7 mmol) of benzaldehyde, 621 mg (4.7 mmol) of p-vinylbenzaldehyde and 1.50 g (9.60 mmol) of bis-(2-mercaptoethyl) sulfide were charged in 5 ml of chloroform followed by adding 190 mg (1 mmol) of $TiCl_4$ to be subjected to reaction under agitation at room temperature for 12 hours. The progress of the reaction was confirmed by the disappearance of absorption of IR spectrum at 1700 $cm^{-1}$ due to aidehyde. After the reaction, the resulting mass was washed with a 5 wt % aqueous sodium hydroxide solution and distilled water and the organic phase was concentrated under reduced pressure.

A colorless transparent viscous liquid, which was an objective prepolymer, was obtained. The yield was 91%. The molecular weight of the compound obtained was measured by gel permeation chromatography (GPC) (column; developer, tetrahydrofuran; standard sample, polystyrene) to find about 12000.

The results of measurement by $^1$H-NMR, $^{13}$C-NMR, IR, and elementary analysis of the prepolymer obtained are shown below.

TABLE 1

|  | Mixing ratio in polymerizable composition | | Refractive index | Abbe's number | External appearance | Boiling test |
|---|---|---|---|---|---|---|
| Ex. | | | | | | |
| II-1 | Prepolymer (I) | 100 | 1.672 | 30 | Colorless transparent | O |
| II-2 | Prepolymer (I) | 80 | 1.660 | 32 | Colorless transparent | O |
|  | Divinyl benzene | 20 | | | | |
| II-3 | Prepolymer (I) | 50 | 1.629 | 33 | Colorless transparent | O |
|  | Divinyl benzene | 20 | | | | |
|  | BPE-4 | 30 | | | | |
| II-4 | Pepolymer (I) | 20 | 1.594 | 34 | Colorless transparent | O |
|  | 2G | 20 | | | | |
|  | Styrene | 60 | | | | |
| II-5 | Prepolymer (I) | 20 | 1.558 | 44 | Colorless transparent | O |
|  | BPE-4 | 40 | | | | |
|  | MMA | 40 | | | | |
| II-6 | Prepolymer (II) | 100 | 1.676 | 31 | Colorless transparent | O |
| II-7 | Prepolymer (II) | 80 | 1.663 | 31 | Colorless transparent | O |
|  | Divinyl benzene | 20 | | | | |
| II-8 | Prepolymer (II) | 50 | 1.628 | 33 | Colorless transparent | O |
|  | Divinyl benzene | 20 | | | | |
|  | BPE-4 | 30 | | | | |
| II-9 | Prepolymer (II) | 20 | 1.595 | 34 | Colorless transparent | O |
|  | 2G | 20 | | | | |
|  | Styrene | 60 | | | | |
| II-10 | Prepolymer (II) | 20 | 1.559 | 44 | Colorless transparent | O |
|  | BPE-4 | 40 | | | | |
|  | MMA | 40 | | | | |
| Comp. Ex. | | | | | | |
| 1 | Divinyl benzene | 100 | 1.61 | 30 | White turbid | — |
| 2 | Divinyl benzene | 40 | 1.580 | 34 | Yellow transparent | O |
|  | BPE-4 | 60 | | | | |
| 3 | BPE-4 | 45 | 1.527 | 48 | Colorless transparent | O |
|  | MMA | 55 | | | | |

BPE-4; 2,2-Bis(4-(methacryloyloxy diethoxy)phenyl)propane
2G; Diethyleneglycol dimethacrylate
MMA; Methyl methacrylate $^1$H—NMR(270 MHz, CDCl$_2$, TMS, δ(ppm), J(Hz))

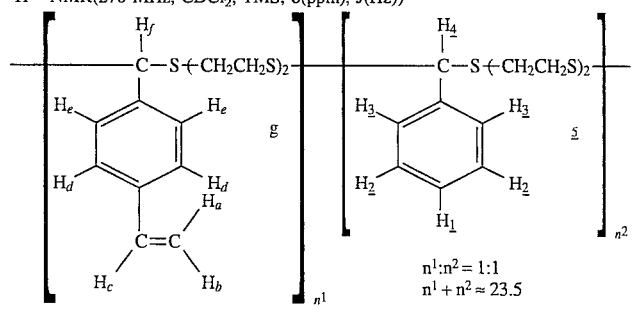

7.35 (1, 2, 3, d, e; m, 9H)
6.68 (c; dd, 1H, Jd=11.1, Je=17.3)
5.74 (a; d, 1H, Jc=17.5)
5.26 (b; d, 1H, Jc=10.6)
5.00 (f, 4; s, 2H)   2.62 (g; 5; m, 16H)

$^{13}$C—NMR(270 MHz, CDCl$_3$, TMS, δ(ppm))

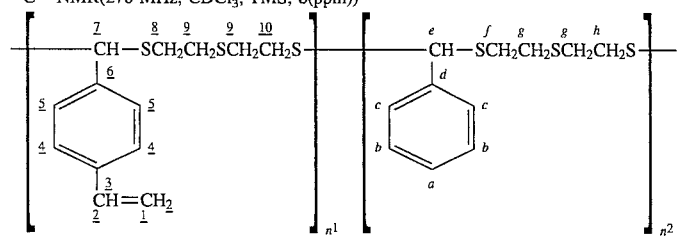

139.62; d
139.05; 3
137.56; 6
136.08; 2
128.70: c
128.23: a
127.91; 4
127.67; b
126.54; 5
114.56; 1
 53.64, 53.39; 7, e
 32.19, 32.21, 32.22, 32.24; 8, 10, f, h
 32.91, 31.90; 9, g

IR (KBr; cm$^{-1}$)
  1510, 860 (para- or di-substituted benzene)
  750, 700 (mono-substituted benzene)
  2990, 1408, 990 (vinyl)
Elementary analysis (C$_{24}$H$_{30}$S$_6$)
  Calculated; H:5.93, C:56.46, S:37.61
  Found; H:6.00, C:56.32, S:37.68

Example III-2

The same procedure as in Example III-1 was repeated except that p-chlorobenzaldehyde was employed in stead of benzaldehyde, to give an objective prepolymer. The yield was 91%. The molecular weight was 11000.

The results of measurement by $^1$H-NMR, IR, and elementary analysis of the prepolymer obtained are shown below, $^1$H—NMR(270 MHz, CDCl$_2$, TMS, δ(ppm), J(Hz))

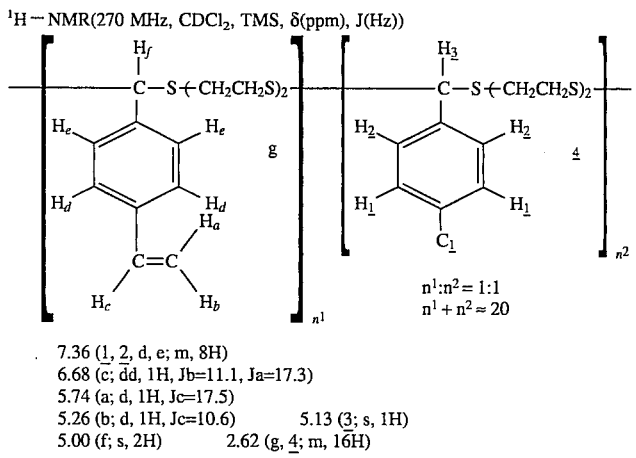

7.36 (1, 2, d, e; m, 8H)
6.68 (c; dd, 1H, Jb=11.1, Ja=17.3)
5.74 (a; d, 1H, Jc=17.5)
5.26 (b; d, 1H, Jc=10.6)  5.13 (3; s, 1H)
5.00 (f; s, 2H)  2.62 (g, 4; m, 16H)

IR (KBr; cm$^{-1}$)
1510, 860 (para- or di-substituted benzene)
1090 (parachlorodi-substituted benzene)
2990, 1408, 990 (vinyl)
Elementary analysis (C$_{24}$H$_{29}$S$_6$Cl)
Calculated; H:5.37, C:52.94, S+Cl:41.69
Found; H:5.31, C:52.98, S+Cl:41.71

Example III-3

The same procedure as in Example III-1 was repeated except that m-chlorobenzaldehyde was employed in stead of benzaldehyde, to give an objective prepolymer. The yield was 93%. The molecular weight was about 11000.

The results of measurement by $^1$H-NMR, $^{13}$C-NMR, IR and elementary analysis of the prepolymer obtained are shown below.

$^1$H—NMR(270 MHz, CDCl$_2$, TMS, δ(ppm), J(Hz))

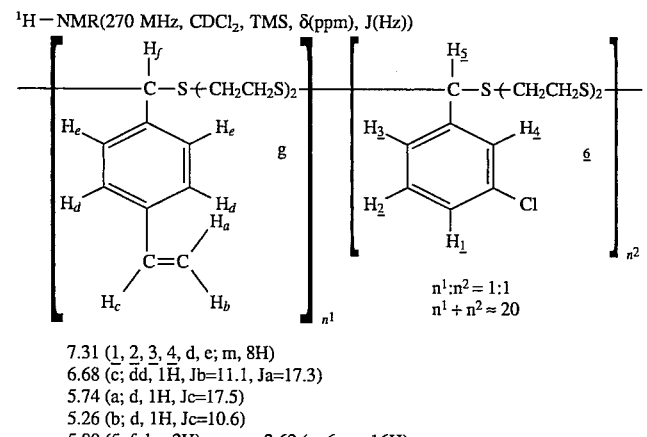

7.31 (1, 2, 3, 4, d, e; m, 8H)
6.68 (c; dd, 1H, Jb=11.1, Ja=17.3)
5.74 (a; d, 1H, Jc=17.5)
5.26 (b; d, 1H, Jc=10.6)
5.00 (5, f; bs, 2H)  2.62 (g, 6; m, 16H)

$^{13}$C—NMR(270 MHz, CDCl$_3$, TMS, δ(ppm))

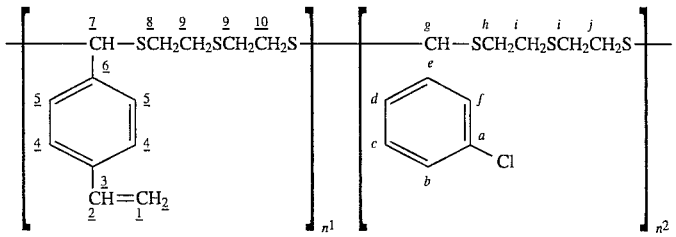

141.76; a    128.35; b
139.05; 3    127.91; 4
137.56; 6    127.74; d
136.08; 2    126.54; 5
134.41; e    125.87; c
129.92; f    114.56; 1
53.39; 7
53.05; g
32.19, 32.21, 32.22, 32.24; 8, 10, h, j
31.97; i    31.90; 9

$n^1:n^2 = 1:1$
$n^1 + n^2 \approx 20$

IR (KBr; cm$^{-1}$)
   1510, 860 (para- or di-substituted benzene)
   1075 (metachlorodi-substituted benzene)
   2990, 1408, 990 (vinyl)
Elementary analysis ($C_{24}H_{29}S_6Cl$)
   Calculated; H:5.37, C:52.94, S+Cl:41.69
   Found; H:5.30, C:52.99, S+Cl:41.71

Example III-4

The same procedure as in Example III-1 was repeated except that m-chlorobenzaldehyde was employed in stead of benzaldehyde, and bis(2-mercaptoethyl)-1,2-dithioethane($HS(CH_2CH_2S)_3H$) employed in stead of bis-(2-mercaptoethyl) sulfide, to obtain an objective prepolymer. The yield was 91%. The molecular weight was about 16500.

The results of measurement by $^1$H-NMR, IR, and elementary analysis of the prepolymer obtained are shown below.

790, 695 (meta- or di-substituted benzene)
   1075 (metachlorodi-substituted benzene)
   2990, 1408, 990 (vinyl)
Elementary analysis ($C_{28}H_{37}S_8Cl$)
   Calculated; H:5.62, C:50.60, S+Cl:43.78
   Found; H:5.59, C:50.63, S+Cl:43.78

Example III-5 to III-7

The same procedure as in Example III-4 was repeated except that p-vinylbenzaldehyde and m-chlorobenzaldehyde were reacted in charging ratios shown in Table 2, to obtain objective prepolymers. In terms of the prepolymers thus obtained, ratios in strength of $^1$H-NMR between acetal methine due to the p-vinylbenzaldehyde residue and acetal methine due to the m-chlorobenzaldehyde residue and the respective molecular weights of the prepolymers are shown in Table 2.

$^1$H—NMR(270 MHz, CDCl$_3$, TMS, δ(ppm), J(Hz))

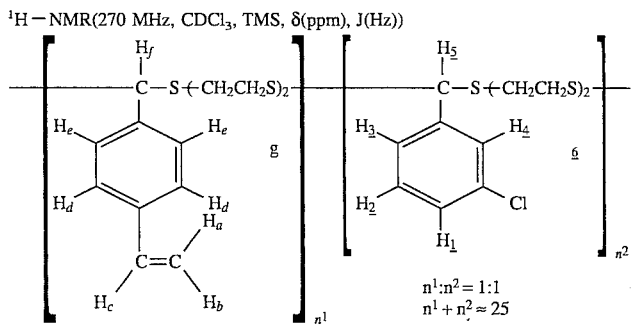

$n^1:n^2 = 1:1$
$n^1 + n^2 \approx 25$ 7.31 (1, 2, 3, 4, d, e; m, 8H)
6.69 (c; dd, 1H, Jb=10.9, Ja=17.3)
5.74 (a; d, 1H, Jc=17.5)
5.26 (b; d, 1H, Jc=10.6)
5.00 (5, f; bs, 2H)      2.62 (g, 6; m, 24H)

IR (KBr; cm$^{-1}$)
   1510, 860 (para- or di-substituted benzene)

TABLE 2

| | Charging ratio p-VBAL:m-CBAL | p-VBAL residue:m-CBAL residue in prepolymer | Molecular weight of prepolymer |
|---|---|---|---|
| Ex. III-4 | 1:1 | 1:1 | 16500 |
| Ex. III-5 | 1:0.75 | 1:0.74 | 16100 |
| Ex. III-6 | 1:0.5 | 1:0.48 | 16000 |
| Ex. III-7 | 1:2 | 1:1.91 | 9900 | p-VBAL: p-vinylbenzaldehyde
m-CBAL: m-chlorobenzaldehyde

Example III-8

The same proceduer as in Example III-1 was repeated except that a mixture of p-vinylbenzaldehyde and m-vinylbenzaldehyde in amounts of 3:7 was employed in stead of p-vinylbenzaldehyde, m-chlorobenzaldehyde was employed in stead of benzaldehyde, and bis(2-mercaptoethyl)-1,2-dithioethane ($HS(CH_2CH_2S)_3H$) was employed in stead of bis-(2-mercaptoethyl)sulfide, to obtain an objective prepolymer. The yield was 94%. The molecular weight was about 16500.

The results of measurement by $^1$H-NMR, IR, and elementary analysis of the prepolymer obtained are shown below, $^1$H—NMR(270 MHz, $CDCl_3$, TMS, δ(ppm), J(Hz))

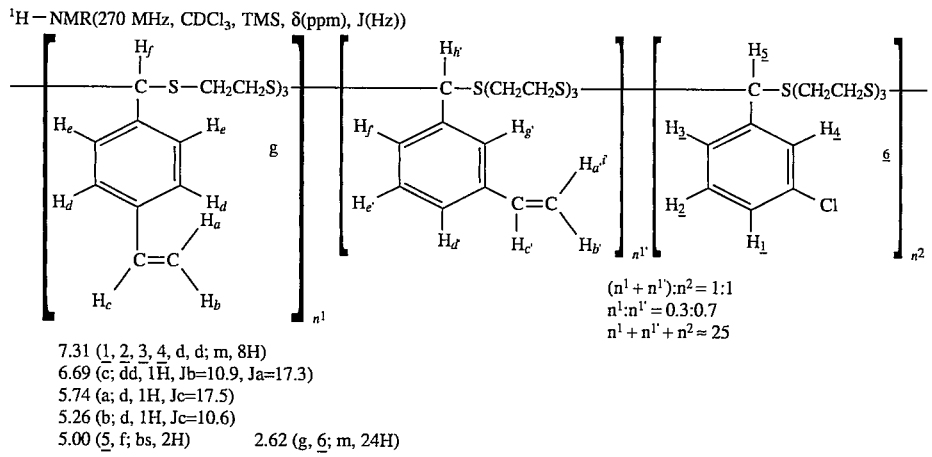

7.31 (1, 2, 3, 4, d, d; m, 8H)
6.69 (c; dd, 1H, Jb=10.9, Ja=17.3)
5.74 (a; d, 1H, Jc=17.5)
5.26 (b; d, 1H, Jc=10.6)
5.00 (5, f; bs, 2H)  2.62 (g, 6; m, 24H)

IR (KBr; $cm^{-1}$)
 1510, 860 (para- or di-substituted benzene)
 790, 695 (meta- or di-substituted benzene)
 1075 (metachlorodi-substituted benzene)
 2990, 1408, 990 (vinyl)
Elementary analysis ($C_{28}H_{37}S_8Cl$)
 Calculated; H: 5.62, C: 50.60, S+Cl:43.78
 Found; H:5.55, C:50.69, S+Cl:43.76

Example III-9

0.01 g of a polymerization initiator available under the tradename "PERBUTYL O" from NOF CORPORATION was added to 1 g of the prepolymer obtained in Example III-3. After the inside of the test tube was replaced by nitrogen, the prepolymer was heated and cured at 70° C. for 12 hours. The refractive index and Abbe's number of the resin thus obtained were measured using an Abbe's refractometer (Tradename "2T" manufactured by ATAGO KK). The resin having refractive index of 1.66 and Abbe's number of 33 excellent in refractivity and color aberration was obtained.

Example IV-1 IV-8

Polymerizable compositions containing prepolymers prepared in Examples III-1 to III-8 (referred as "Prepolymers III-1 to III-8") shown in Table 3 were heated and cured in accordance with the procedures described in Examples II-1 to II-10. The refractive index and Abbe's number were measured similarly to Examples II-1 to II-10 and shown in Table 3.

TABLE 3

| | | | | Refractive index | Abbe's number |
|---|---|---|---|---|---|
| Ex. IV-1 | IV-1-1 | Prepolymer III-1 | 100 | 1.674 | 31 |
| | IV-1-2 | Prepolymer III-1 | 80 | 1.662 | 31 |
| | | Divinyl benzene | 20 | | |
| | IV-1-3 | Prepolymer III-1 | 50 | 1.630 | 33 |
| | | Divinyl benzene | 20 | | |
| | | BPE-4 | 30 | | |
| | IV-1-4 | Prepolymer III-1 | 20 | 1.594 | 34 |
| | | 2G | 20 | | |
| | | Styrene | 60 | | |
| | IV-1-5 | Prepolymer III-1 | 20 | 1.558 | 44 |
| | | BPE-4 | 40 | | |
| | | MMA | 40 | | |
| Ex. IV-2 | IV-2-1 | Prepolymer III-2 | 100 | 1.659 | 33 |
| | IV-2-2 | Prepolymer III-2 | 80 | 1.650 | 33 |
| | | Divinyl benzene | 20 | | |
| | IV-2-3 | Prepolymer III-2 | 50 | 1.622 | 34 |
| | | Divinyl benzene | 20 | | |
| | | BPE-4 | 30 | | |
| | IV-2-4 | Prepolymer III-2 | 20 | 1.591 | 35 |

TABLE 3-continued

|  |  |  | | Refractive index | Abbe's number |
|---|---|---|---|---|---|
|  |  | 2G | 20 |  |  |
|  |  | Styrene | 60 |  |  |
|  | IV-2-5 | Prepolymer III-2 | 20 | 1.555 | 44 |
|  |  | BPE-4 | 40 |  |  |
|  |  | MMA | 40 |  |  |
| Ex. IV-3 | IV-3-1 | Prepolymer III-3 | 100 | 1.667 | 33 |
|  | IV-3-2 | Prepolymer III-3 | 80 | 1.656 | 34 |
|  |  | Divinyl benzene | 20 |  |  |
|  | IV-3-3 | Prepolymer III-3 | 50 | 1.627 | 34 |
|  |  | Divinyl benzene | 20 |  |  |
|  |  | BPE-4 | 30 |  |  |
|  | IV-3-4 | Prepolymer III-3 | 20 | 1.593 | 34 |
|  |  | 2G | 20 |  |  |
|  |  | Styrene | 60 |  |  |
|  | IV-3-5 | Prepolymer III-3 | 20 | 1.557 | 45 |
|  |  | BPE-4 | 40 |  |  |
|  |  | MMA | 40 |  |  |
| Ex. IV-4 | IV-4-1 | Prepolymer III-4 | 100 | 1.658 | 32 |
|  | IV-4-2 | Prepolymer III-4 | 80 | 1.649 | 34 |
|  |  | Divinyl benzene | 20 |  |  |
|  | IV-4-3 | Prepolymer III-4 | 50 | 1.622 | 34 |
|  |  | Divinyl benzene | 20 |  |  |
|  |  | BPE-4 | 30 |  |  |
|  | IV-4-4 | Prepolymer III-4 | 20 | 1.591 | 35 |
|  |  | 2G | 20 |  |  |
|  |  | Styrene | 60 |  |  |
|  | IV-4-5 | Prepolymer III-4 | 20 | 1.555 | 46 |
|  |  | BPE-4 | 40 |  |  |
|  |  | MMA | 40 |  |  |
| Ex. IV-5 | IV-5-1 | Prepolymer III-5 | 100 | 1.643 | 31 |
|  | IV-5-2 | Prepolymer III-5 | 80 | 1.637 | 33 |
|  |  | Divinyl benzene | 20 |  |  |
|  | IV-5-3 | Prepolymer III-5 | 50 | 1.615 | 34 |
|  |  | Divinyl benzene | 20 |  |  |
|  |  | BPE-4 | 30 |  |  |
|  | IV-5-4 | Prepolymer III-5 | 20 | 1.588 | 34 |
|  |  | 2G | 20 |  |  |
|  |  | Styrene | 60 |  |  |
|  | IV-5-5 | Prepolymer III-5 | 20 | 1.552 | 46 |
|  |  | BPE-4 | 40 |  |  |
|  |  | MMA | 40 |  |  |
| Ex. IV-6 | IV-6-1 | Prepolymer III-6 | 100 | 1.631 | 32 |
|  | IV-6-2 | Prepolymer III-6 | 80 | 1.627 | 33 |
|  |  | Divinyl benzene | 20 |  |  |
|  | IV-6-3 | Prepolymer III-6 | 50 | 1.609 | 35 |
|  |  | Divinyl benzene | 20 |  |  |
|  |  | BPE-4 | 30 |  |  |
|  | IV-6-4 | Prepolymer III-6 | 20 | 1.586 | 35 |
|  |  | 2G | 20 |  |  |
|  |  | Styrene | 60 |  |  |
|  | IV-6-5 | Prepolymer III-6 | 20 | 1.550 | 46 |
|  |  | BPE-4 | 40 |  |  |
|  |  | MMA | 40 |  |  |
| Ex. IV-7 | IV-7-1 | Prepolymer III-7 | 100 | 1.608 | 30 |
|  | IV-7-2 | Prepolymer III-7 | 80 | 1.609 | 31 |
|  |  | Divinyl benzene | 20 |  |  |
|  | IV-7-3 | Prepolymer III-7 | 50 | 1.597 | 31 |
|  |  | Divinyl benzene | 20 |  |  |
|  |  | BPE-4 | 30 |  |  |
|  | IV-7-4 | Prepolymer III-7 | 20 | 1.581 | 32 |
|  |  | 2G | 20 |  |  |
|  |  | Styrene | 60 |  |  |
|  | IV-7-5 | Prepolymer III-7 | 20 | 1.545 | 44 |
|  |  | BPE-4 | 40 |  |  |
|  |  | MMA | 40 |  |  |
| Ex. IV-8 | IV-8-1 | Prepolymer III-8 | 100 | 1.660 | 33 |
|  | IV-8-2 | Prepolymer III-8 | 80 | 1.650 | 34 |
|  |  | Divinyl benzene | 20 |  |  |
|  | IV-8-3 | Prepolymer III-8 | 50 | 1.623 | 34 |
|  |  | Divinyl benzene | 20 |  |  |
|  |  | BPE-4 | 30 |  |  |
|  | IV-8-4 | Prepolymer III-8 | 20 | 1.592 | 35 |
|  |  | 2G | 20 |  |  |
|  |  | Styrene | 60 |  |  |
|  | IV-8-5 | Prepolymer III-8 | 20 | 1.556 | 46 |

TABLE 3-continued

|  |  | Refractive index | Abbe's number |
|---|---|---|---|
| BPE-4 | 40 |  |  |
| MMA | 40 |  |  |

BPE-4; 2,2-bis(4-(methacryloyloxy diethoxy)phenyl)propane
2G; Diethyleneglycol dimethacrylate
MMA; Methyl methacrylate Although the present invention has been described with reference to the preferred examples, it should be understood that various modifications and variations can be easily made by those skilled in the art without departing from the spirit of the invention. Accordingly, the foregoing disclosure should be interpreted as illustrative only and is not to be interpreted in a limiting sense. The present invention is limited only by the scope of the following claims.

What is claimed is:

1. A prepolymer comprising a structural unit represented by the formula

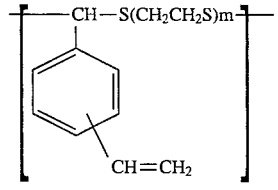

where m denotes a positive number of from 2 to 20 with a polymerization degree of 2 to 1000.

2. The prepolymer as claimed in claim 1 wherein the prepolymer has a molecular weight in a range of from 500 to 500,000. said molecular weight being measured by gel permeation chromatography with polystyrene as a standard sample.

3. The prepolymer as claimed in claim 1 wherein the prepolymer is represented by the formula selected from the group consisting of

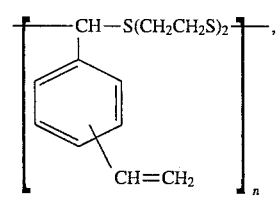,

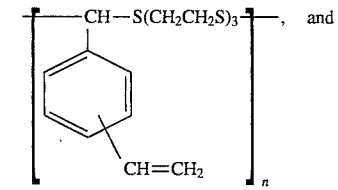 and

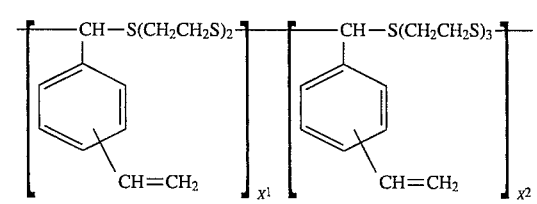

where n denotes a positive number of from 2 to 20 and $X^1 + X^2 = n$.

4. A prepolymer comprising a structural unit represented by the formula

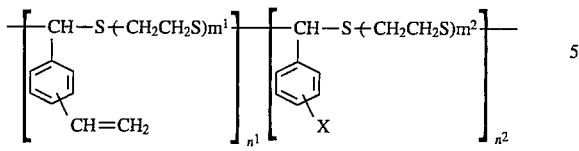

where X denotes a hydrogen atom or a halogen atom, $m^1$ and $m^2$ denote positive numbers of from 2 to 20 and $n^1+n^2$ denote positive numbers of from 2 to 1000, with $n^1$ and $n^2$ being not equal to 0, said prepolymer having a polymerization degree of 2 to 1000.

5. The prepolymer as claimed in claim 4 wherein the prepolymer has a molecular weight of 500 to 500,000, said molecular weight being measured by gel permeation chromatography with polystyrene as a standard sample.

6. The prepolymer as claimed in claim 4 wherein the prepolymer is selected from the group consisting of prepolymers represented by the formulas

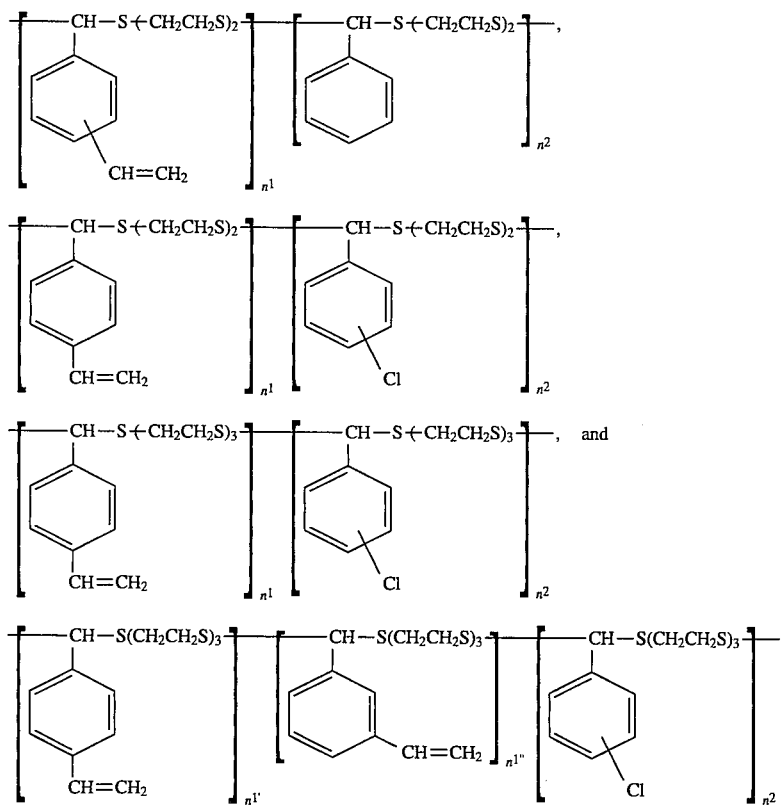

wherein $n^1+n^2$ denotes a positive number of from 2 to 1000, $n^1$ and $n^2$ being not equal to zero and $n^{1'}+n^{1''}=n^1$.

* * * * *